(12) United States Patent
Hoshi et al.

(10) Patent No.: US 11,031,597 B2
(45) Date of Patent: Jun. 8, 2021

(54) NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: HITACHI CHEMICAL COMPANY, LTD., Tokyo (JP)

(72) Inventors: Kento Hoshi, Tokyo (JP); Hideyuki Tsuchiya, Tokyo (JP); Tsutomu Satoh, Tokyo (JP)

(73) Assignee: SHOWA DENKO MATERIALS CO., LTD., Tokyo (JP)

( * ) Notice: Subject to any disclaimer, the term of this patent is extended or adjusted under 35 U.S.C. 154(b) by 161 days.

(21) Appl. No.: 16/475,857

(22) PCT Filed: Jan. 4, 2018

(86) PCT No.: PCT/JP2018/000040
§ 371 (c)(1),
(2) Date: Jul. 3, 2019

(87) PCT Pub. No.: WO2018/128179
PCT Pub. Date: Jul. 12, 2018

(65) Prior Publication Data
US 2019/0348679 A1 Nov. 14, 2019

(30) Foreign Application Priority Data
Jan. 6, 2017 (JP) .............................. JP2017-001162

(51) Int. Cl.
H01M 4/587 (2010.01)
C01B 32/20 (2017.01)
H01M 4/133 (2010.01)
H01M 10/0525 (2010.01)
H01M 4/02 (2006.01)

(52) U.S. Cl.
CPC ............. *H01M 4/587* (2013.01); *C01B 32/20* (2017.08); *H01M 4/133* (2013.01); *H01M 10/0525* (2013.01); *C01P 2002/82* (2013.01); *C01P 2004/61* (2013.01); *C01P 2006/40* (2013.01); *H01M 2004/021* (2013.01); *H01M 2004/027* (2013.01)

(58) Field of Classification Search
CPC ........... H01M 4/133; H01M 2004/021; H01M 4/587; H01M 10/0525; C01B 32/20
USPC ....................................................... 429/209
See application file for complete search history.

(56) References Cited

FOREIGN PATENT DOCUMENTS

JP 2010-251315 A 11/2010
JP 2015-164143 A 9/2015

*Primary Examiner* — James M Erwin
(74) *Attorney, Agent, or Firm* — Fitch, Even, Tabin & Flannery, LLP

(57) ABSTRACT

A negative electrode material for a lithium-ion secondary battery contains graphitic particles of which a standard deviation of circularity at a cumulative frequency ranging from 10% by particle to 90% by particle from the lower circularity, determined by a flow-type particle analyzer, is from 0.05 to 0.1.

8 Claims, 1 Drawing Sheet

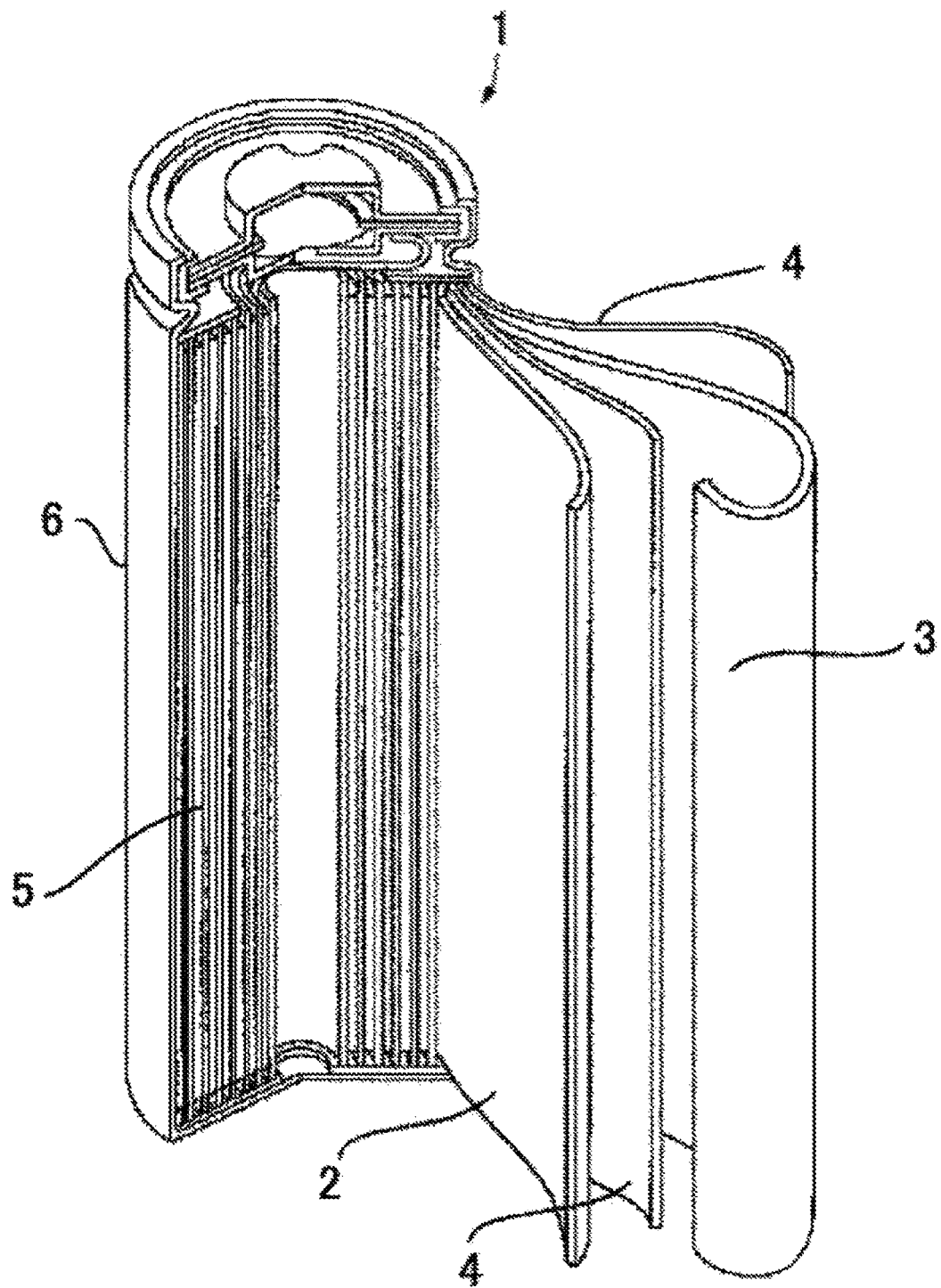

NEGATIVE ELECTRODE MATERIAL FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATIONS

This application is a U.S. national phase application filed under 35 U.S.C. § 371 of International Application No. PCT/JP2018/000040, filed Jan. 4, 2018, designating the United States, which claims priority from Japanese Patent Application No.: 2017-001162 filed Jan. 6, 2017, the entire contents of each of which are hereby incorporated herein by reference.

TECHNICAL FIELD

The present invention relates to a negative electrode material for a lithium-ion secondary battery, a negative electrode for a lithium-ion secondary battery, and a lithium-ion secondary battery.

BACKGROUND ART

A lithium-ion battery (lithium-ion secondary battery) is a secondary battery being light and having a high energy density, and is used as a power source for a portable device, such as a notebook computer, and a cell phone, utilizing such characteristics.

In recent years, lithium-ion secondary batteries have been developed not only for household applications such as portable devices but also for vehicle installation applications, large-scale electricity storage system applications for natural energy, such as photovoltaic power generation and wind power generation, and the like. In particular, the lithium-ion secondary batteries have required excellent input characteristics for improving the efficiency of utilization of energy by regeneration in applications to automotive fields. The lithium-ion secondary batteries have also required excellent long-life characteristics.

For example, Patent Document 1 proposes a negative electrode material for a non-aqueous secondary battery, including two graphitic particles having different optimal Raman R values (crystallinity), of which one has an average circularity of 0.9 or more, determined by a flow-type particle analyzer, thereby exhibiting a high capacity, rapid charge-discharge characteristics, and high cycle characteristics.

Patent Document 2 proposes a negative electrode material for a non-aqueous secondary battery, exhibiting characteristics of excellent charge-discharge efficiency at low irreversible capacity by mixing graphitic particles having an average circularity of 0.9 or more and graphite particles having a high aspect ratio.

RELATED ART DOCUMENT

Patent Document

Patent Document 1: Japanese Patent Application Laid-Open (JP-A) No. 2010-251315
Patent Document 1: JP-A No. 2015-164143

SUMMARY OF INVENTION

Technical Problem

However, regarding Patent Document 1, it has been found from the results of studies of the inventors that the two graphites are merely mixed, and the effect of pulse charge characteristics is low although continuous rapid input characteristics are superior to those in conventional technologies. In Patent Document 2, pulse charge is not described at all while the two graphites having different particle diameters are mixed, and one graphite has a high aspect ratio, whereby an irreversible capacity is reduced. It has been found from the results of further studies of the inventors that graphitic particles having a high aspect ratio exhibit the low effect of pulse charge characteristics.

One aspect of the invention was made in view the foregoing conventional circumstances with an object of providing a negative electrode material for a lithium-ion secondary battery, having low irreversible capacity and excellent pulse charge characteristics, as well as a negative electrode for a lithium-ion secondary battery and a lithium-ion secondary battery using the negative electrode material for a lithium-ion secondary battery.

Solution to Problem

A specific means for solving the above-described problems includes the following embodiments.
<1> A negative electrode material for a lithium-ion secondary battery, containing graphitic particles of which a standard deviation of circularity at a cumulative frequency ranging from 10% by particle to 90% by particle from a lower circularity, determined by a flow-type particle analyzer, is from 0.05 to 0.1.
<2> The negative electrode material for a lithium-ion secondary battery according to <1>, in which the circularity at a cumulative frequency of 10% by particle of the graphitic particles is from 0.7 to 0.9.
<3> The negative electrode material for a lithium-ion secondary battery according to <1> or <2>, in which an average particle size of the graphitic particles is from 2 μm to 30 μm.
<4> The negative electrode material for a lithium-ion secondary battery according to any one of <1> to <3>, in which a Raman R value (ID/IG), which is a ratio of a peak intensity ID within a range of from 1300 $cm^{-1}$ to 1400 $cm^{-1}$ to a peak intensity IG within a range of from 1580 $cm^{-1}$ to 1620 $cm^{-1}$, upon irradiating the graphitic particles with laser light at 532 nm is from 0.10 to 0.60.
<5> The negative electrode material for a lithium-ion secondary battery according to any one of <1> to <4>, further containing amorphous carbon particles, in which a standard deviation of circularity at a cumulative frequency ranging from 10% by particle to 90% by particle from a lower circularity of mixed particles of the graphitic particles and the amorphous carbon particles, determined by a flow-type particle analyzer, is from 0.05 to 0.1.
<6> The negative electrode material for a lithium-ion secondary battery according to <5>, in which a content of the amorphous carbon particles in the negative electrode material is from 1% by mass to 30% by mass.
<7> A negative electrode for a lithium-ion secondary battery, containing:
a current collector; and
a negative electrode material layer that is provided on or above the current collector and that contains the negative electrode material for a lithium-ion secondary battery according to any one of <1> to <6>.
<8> A lithium-ion secondary battery, containing the negative electrode for a lithium-ion secondary battery according to <7>.

Advantageous Effects of Invention

According to one embodiment in the present invention, a negative electrode material for a lithium-ion secondary battery, having low irreversible capacity and excellent pulse charge characteristics can be provided, as well as a negative electrode for a lithium-ion secondary battery and a lithium-ion secondary battery using the negative electrode material for a lithium-ion secondary battery.

BRIEF DESCRIPTION OF DRAWINGS

FIG. 1 is a perspective cross-sectional view illustrating one example of a lithium-ion secondary battery according to the present disclosures.

DESCRIPTION OF EMBODIMENTS

Hereinafter, embodiments of the present invention will be described in detail. However, the present invention is not limited to the following embodiments. In the following embodiments, the constituent elements (including the element steps and the like) are not indispensable except when particularly explicitly mentioned. The same applies to numerical values and ranges thereof, and does not limit the present invention. Various conversion and modification are allowed by a person skilled in the art within a technical idea disclosed in the present specification.

In the present disclosures, each numerical range specified using "(from) . . . to . . . " represents a range including the numerical values noted before and after "to" as the minimum value and the maximum value, respectively.

In the present disclosures, with respect to numerical ranges stated hierarchically herein, the upper limit or the lower limit of a numerical range of a hierarchical level may be replaced with the upper limit or the lower limit of a numerical range of another hierarchical level. Further, in the present specification, with respect to a numerical range, the upper limit or the lower limit of the numerical range may be replaced with a relevant value shown in any of Examples.

In the present disclosures, each component may include plural kinds of substances corresponding to the component. In a case in which plural kinds of substances exist corresponding to a component in the composition, the content means, unless otherwise specified, the total amount of the plural kinds of substances existing in the composition.

In the present disclosures, the term "layer" or "membrane" comprehends herein not only a case in which the layer or membrane is formed over the whole observed region where the layer or membrane is present, but also a case in which the layer or membrane is formed only on part of the region.

In the present disclosures, the term "solid mass" of a positive electrode material mixture or a negative electrode material mixture means a remaining component obtained by removing a volatile component such as an organic solvent from a slurry of the positive electrode material mixture or a slurry of the negative electrode material mixture.

<Negative Electrode Material for Lithium-Ion Secondary Battery>

A negative electrode material for lithium-ion secondary battery includes a graphitic particles of which a standard deviation of circularity at a cumulative frequency ranging from 10% by particle to 90% by particle from the lower circularity (hereinafter also referred to as "standard deviation of circularity within the specific range"), determined by a flow-type particle analyzer, is from 0.05 to 0.1. The graphitic particles can function as a negative electrode active material.

The negative electrode for a lithium-ion secondary battery and lithium-ion secondary battery in the present disclosure, having low irreversible capacity and excellent pulse charge characteristics, can be produced by using the negative electrode material for a lithium-ion secondary battery in the present disclosure, including the graphitic particles of which the standard deviation of circularity within the specific range is from 0.05 to 0.1.

The standard deviation of circularity within the specific range of the graphitic particles is preferably from 0.06 to 0.1, more preferably from 0.06 to 0.09, and still more preferably from 0.06 to 0.08.

The circularity of the graphitic particles can be measured using a wet flow type particle diameter/shape analysis apparatus (FPIA-3000, manufactured by Malvern Instruments Ltd.). For example, the analysis of the standard deviation of circularity within the specific range based on the results of the measurement of the circularity can be performed based on an academic document for FPIA-3000 (2nd edition, published on Aug. 31, 2006).

In the measurement, temperature is set at 25° C., the concentration of a measurement sample is set at 10% by mass, and the number of particles to be counted is set at 10000. Water is used as a solvent for dispersion.

It is preferable to disperse the graphitic particles in advance in the case of measuring the circularity of the graphitic particles. For example, the graphitic particles can be dispersed using ultrasonic dispersion, a vortex mixer, or the like. Intensity and time of dispersion treatment may be adjusted, if appropriate, in the light of the strength of the graphitic particles to be measured, in order to suppress the influence of the particle decay or particle fracture of the graphitic particles.

As ultrasonic treatment, it is preferable to store an optional amount of water, for example, in the tank of an ultrasonic washer (ASU-10D, manufactured by AS ONE Corporation), and then perform ultrasonic treatment of a test tube in which a dispersion liquid of the graphitic particles is put, together with a holder, for from 1 minute to 10 minutes. Within the time, the graphitic particles can be dispersed while suppressing the particle decay and particle fracture of the graphitic particles, an increase in the temperature of a sample, and the like.

Regarding each of the graphitic particles and the mixed particles of the graphitic particles and amorphous carbon particles, the standard deviation of circularity within the specific range can be determined as a difference (upper value−lower value) between a circularity (upper value) at a cumulative frequency of 90% by particle from a lower circularity and a circularity (lower value) at a cumulative frequency of 10% by particle from a lower circularity, determined by a flow-type particle analyzer.

The average circularity of the graphitic particles is not particularly limited as long as the standard deviation of circularity within the specific range is in a range of from 0.05 to 0.1. For example, the average circularity is preferably 0.70 or more, and more preferably 0.85 or more. An average circularity of the graphitic particles of 0.70 or more tends to result in improvement in continuous charge acceptance property.

A circularity at a cumulative frequency of the graphitic particles (cumulative frequency from a lower circularity, determined by a flow-type particle analyzer) of 10% by particle is preferably from 0.7 to 0.9.

Next, physical properties of graphitic particles will be explained.

Graphitic particles in the present disclosures include a graphite as a component, and having a carbon network plane interval (d002) of less than 0.34 nm by wide-angle X-ray diffraction method.

In the present disclosures, the carbon network plane interval d002 can be calculated using the Bragg's equation, from a diffraction peak corresponding to the carbon 002 plane appearing in the vicinity of the diffraction angle 2θ=24° to 27° of a diffraction profile obtained by measuring a diffraction line with a goniometer by irradiating the sample with X rays (CuKα rays).

d002 can be measured under the following conditions.
Radiation source: CuKα ray (wavelength=0.15418 nm)
Output: 40 kV, 20 mA
Sampling width: 0.010°
Scanning range: from 10° to 35°
Scanning speed: 0.5°/min
Bragg's equation: 2d·sin θ=nλ

Here, d is one period length, θ is the diffraction angle, n is the reflection order, and λ, is the X-ray wavelength.

The resultant obtained by grinding lump natural graphite may be used as the graphitic particles. The graphitic particles obtained by grinding lump natural graphite may include impurities, and therefore, it is preferable to allow the natural graphite to have higher purity by refining treatment.

A method of the refining treatment of the natural graphite is not particularly limited, and can be selected from commonly used refining treatment methods, if appropriate. Examples thereof include ore floatation, electrochemical treatment, and chemical treatment.

A purity of natural graphite is preferably 99.8% or more (ash content of 0.2% or less), and more preferably 99.9% or more (ash content of 0.1% or less), based on a mass. The purity of 99.8% or more tends to result in more improvement in the safety of a battery and in more improvement in battery performance.

The purity of natural graphite can be calculated by, for example, leaving 100 g of graphite to stand in a furnace at 800° C. in air atmosphere for 48 hours or more, and then measuring the amount of residue derived from an ash content.

The resultant obtained by grinding artificial graphite obtained by burning, for example, a resin-based material such as epoxy resin or phenolic resin, or a pitch-based material obtained from petroleum, coal, or the like may be used as the graphitic particles.

A method for obtaining artificial graphite is not particularly limited, and examples thereof include a method in which a raw material such as thermoplastic resin, naphthalene, anthracene, phenanthroline, coal tar, or tar pitch is calcined in inert atmosphere at 800° C. or more to obtain artificial graphite which is a burned product. Then, the obtained burned product is ground by a known method such as a jet mill, a vibration mill, a pin mill, or a hammer mill, and the average particle size thereof is adjusted to from around 2 μm to around 40 μm, whereby graphitic particles derived from artificial graphite can be produced. Before the calcination, heat treatment of the raw material may be performed in advance. In the case in which the heat treatment of the raw material is performed, the graphitic particles derived from artificial graphite can be obtained by, for example, performing the heat treatment in advance by a device such as an autoclave, performing coarse grinding by a known method, then calcining the heat-treated raw material in inert atmosphere at 800° C. or more in such a manner as described above, grinding artificial graphite which is the obtained burned product, and adjusting the average particle size thereof to from around 2 μm to around 40 μm.

Graphitic particles may be reformed by other material except graphite. The graphitic particles may have, for example, a low-crystalline carbon layer on the surface of a graphite particle to be a nucleus. In a case in which the graphitic particles have a low-crystalline carbon layer on the surface of graphite, a ratio (mass ratio) of the low-crystalline carbon layer with respect to 1 part by mass of graphite is preferably from 0.005 to 10, more preferably from 0.005 to 5, and still more preferably from 0.005 to 0.08. In a case in which the ratio (mass ratio) of the low-crystalline carbon layer with respect to the graphite is 0.005 or more, initial charge-discharge efficiency and life characteristics tend to be excellent. In a case in which the ratio is 10 or less, output characteristics tend to be excellent.

In a case in which the graphitic particles are reformed by the other material except graphite, a contents of the graphite and the other material except the graphite, included in the graphitic particles, can be calculated from, for example, a weight loss ratio at from 500° C. to 600° C. in air flow, obtained by measuring a change in weight in airflow by TG-DTA (Thermogravimetry-Differential Thermal Analysis). The change in weigh in a temperature range from 500° C. to 600° C. can be allowed to belong to a change in weight derived from the other material except graphite. The remainder after the end of the heat treatment can be allowed to belong to the amount of graphite.

A method of producing the graphitic particles having a low-crystalline carbon layer on the surface of a graphite particle to be a nucleus is not particularly limited. The method preferably includes, for example, a process of heat-treating a mixture including a graphite particle to be a nucleus and a precursor of a carbon material that has lower crystalline nature than the graphite particle. The above-described graphitic particles can be efficiently produced by the method.

The precursor of the carbon material that has lower crystalline nature than the graphite is not particularly limited, and includes a pitch or an organic polymer compound.

Examples of the pitch include ethylene heavy end pitch, petroleum pitch, coal-tar pitch, asphalt decomposition pitch, pitch generated by thermal decomposition of polyvinyl chloride or the like, and synthetic pitch produced by polymerization of naphthalene or the like in the presence of a superacid. Examples of the organic polymer compound include a thermoplastic synthetic resin such as polyvinyl chloride, polyvinyl alcohol, polyvinyl acetate and polyvinyl butyral, and a natural product such as starch and cellulose.

A temperature at which the mixture is heat-treated is not particularly limited, and is preferably from 950° C. to 1500° C. in view of improving the input-output performance of a lithium-ion secondary battery.

In the method described above, a contents of a graphite particle to be a nucleus in the mixture prior to the heat treatment and a contents of a precursor of a carbon material that has lower crystalline nature than the graphite particle in the mixture prior to the heat treatment are not particularly limited. The content of the graphite particle to be a nucleus is preferably from 85% by mass to 99.9% by mass with respect to the total mass of the mixture in view of improving the input-output performance of the lithium-ion secondary battery.

The graphitic particles have a Raman R value (ID/IG) of preferably from 0.10 to 0.60, more preferably from 0.15 to 0.55, and still more preferably from 0.20 to 0.50, which is a ratio of a peak intensity (ID) within a range of from 1300 cm$^{-1}$ to 1400 cm$^{-1}$ with respect to a peak intensity (IG) within a range of from 1580 cm$^{-1}$ to 1620 cm$^{-1}$ upon irradiating the graphitic particles with laser light having a wavelength of 532 nm.

Raman spectroscopy can be conducted using a Raman spectrophotometer (for example, DXR Raman microscope manufactured by ThermoFisher Scientific Inc.).

An average particle size of graphitic particles is preferably from 2 μm to 30 μm, more preferably from 2.5 μm to 25 μm, still more preferably from 3 μm to 20 μm, and and further more preferably from 5 μm to 20 μm. In a case in which the average particle size of graphitic particles is 30 μm or less, there is a tendency that a discharge capacity and discharge characteristics are improved. In a case in which the average particle size of graphitic particles is 2 μm or more, there is a tendency that an initial charge-discharge efficiency is improved.

The average particle size (d50) is a volume-average particle size determined as d50 (median diameter) by measuring a particle size distribution based on a volume using a particle size distribution measurement apparatus (for example, SALD-3000, manufactured by SHIMADZU CORPORATION) utilizing a laser light scattering method.

A BET specific surface area of the graphitic particles is preferably from 0.8 m$^2$/g to 8 m$^2$/g, more preferably from 1 m$^2$/g to 7 m$^2$/g, and still more preferably from 1.5 m$^2$/g to 6 m$^2$/g.

In a case in which the BET specific surface area is 0.8 m$^2$/g or more, there is a tendency that battery performance is excellent. In a case in which the BET specific surface area is 8 m$^2$/g or less, there is a tendency that tap density is improved to be excellent in mixing performance with other materials such as a binder, an electroconductive agent.

The BET specific surface area may be measured, for example, by a nitrogen adsorption capacity according to JIS Z 8830:2013. Examples for a measuring apparatus include an AUTOSORB-1 (trade name) manufactured by Quantachrome Instruments. In measuring the BET specific surface area, moisture adsorbed on a surface or in a structure of a sample may conceivably influence a gas adsorption capacity, and therefore a pretreatment for removing moisture by heating is preferably conducted firstly. In the pretreatment, a measurement cell loaded with 0.05 g of a measurement sample is evacuated by a vacuum pump to be 10 Pa or less, then heated at 110° C. for a duration of 3 hours or longer, and cooled naturally to normal temperature (25° C.) while maintaining the reduced pressure. After the pretreatment, the measurement temperature is lowered to 77K and a measurement is conducted in a measurement pressure range of less than 1 in terms of relative pressure which is namely an equilibrium pressure with respect to a saturated vapor pressure.

The negative electrode material for a lithium-ion secondary battery in the present disclosure may contain amorphous carbon particles as well as graphitic particles. Output characteristics and energy density can be further improved while maintaining input characteristics by using the graphitic particles and the amorphous carbon particles in combination.

In a case in which the amorphous carbon particles are contained, the standard deviation of circularity within the specific range of the mixed particles of the graphitic particles and the amorphous carbon particles, determined by a flow-type particle analyzer, is preferably from 0.05 to 0.1, more preferably from 0.06 to 0.1, and still more preferably from 0.07 to 0.1.

In a case in which the negative electrode material for a lithium-ion secondary battery in the present disclosure contains amorphous carbon particles, a rate of amorphous carbon particles with respect to the negative electrode material for a lithium-ion secondary battery in the present disclosure is preferably from 1% by mass to 30% by mass, more preferably from 2% by mass to 25% by mass, still more preferably from 3% by mass to 20% by mass, and particularly preferably from 5% by mass to 20% by mass, from the viewpoint of improvement in pulse charge characteristics and of energy density. In a case in which the rate of the amorphous carbon particles is 1% by mass or more, pulse charge characteristics tend to be improved. In a case in which the rate of the amorphous carbon particles is 30% by mass or less, both the maintenance of input characteristics and overcharge resistance tend to be able to be achieved.

Next, physical properties of amorphous carbon particles will be explained.

The amorphous carbon particles in the present disclosures include an amorphous carbon as a component. The carbon network plane interval (d002) of the amorphous carbon particles according to wide-angle X-ray diffraction method is preferably from 0.340 nm to 0.390 nm, more preferably from 0.341 nm to 0.385 nm, and still more preferably from 0.342 nm to 0.370 nm. In a case in which the amorphous carbon particles include a soft carbon, the carbon network plane interval (d002) according to wide-angle X-ray diffraction method is preferably from 0.340 nm to 0.360 nm, more preferably from 0.341 nm to 0.355 nm, and still more preferably from 0.342 nm to 0.350 nm.

It is preferable that the mass of the amorphous carbon particles at 550° C. in airflow is 70% by mass or more with respect to the mass thereof at 25° C., and the mass thereof at 650° C. is 20% by mass or less with respect to the mass thereof at 25° C., in thermogravimetric measurement. The thermogravimetric measurement can be performed by a TG analysis (Thermo Gravimetry Analysis) apparatus (for example, TG/DTA6200, manufactured by SII NanoTechnology Inc.). The measurement can be performed under a measurement condition of a temperature-raising rate of 1° C./min using alumina as a reference under flowing of dry air at 300 mL/m by collecting 10 mg of sample.

It is more preferable that the mass of the amorphous carbon particles at 550° C. in airflow is 90% by mass or more with respect to the mass thereof at 25° C., and the mass thereof at 650° C. is 10% by mass or less with respect to the mass thereof at 25° C., from the viewpoint of enabling input-output performance to be further improved.

An average particle size (d50) of amorphous carbon particles is preferably from 1 μm to 30 μm, more preferably from 2 μm to 25 μm, and still more preferably from 2 μm to 23 μm. In a case in which the average particle size is 1 μm or more, there is a tendency that a specific surface area can be set in an appropriate range, the initial charge-discharge efficiency of a lithium-ion secondary battery is excellent, the particles favorably come into contact with each other, and input-output performance is excellent.

In a case in which the average particle size is 30 μm or less, there is a tendency that occurrence of unevenness on an electrode plane is inhibited so that the short circuit of the battery can be suppressed, and the diffusion length of Li from the surface of each particle to the interior thereof is relatively shorter so that the input-output performance of the lithium-ion secondary battery is improved.

The average particle size of the amorphous carbon particles can be measured in a manner similar to the manner in the case of the graphitic particles.

In the negative electrode material for a lithium-ion secondary battery in the present disclosure, particles such as a carbonaceous material other than graphitic particles and amorphous carbon particles used if necessary, a metal oxide such as tin oxide or silicon oxide, a metal composite oxide, simple-substance lithium, a lithium alloy such as lithium-aluminum alloy, or a material that can form an alloy with lithium, the material such as Sn or Si, may be used together as other particles, as a negative electrode active material. The other particles may be used singly, or in combination of two or more kinds thereof.

The metal composite oxide is not particularly limited as long as it is a metal composite oxide capable of occluding and releasing lithium, and is preferably a metal composite oxide containing at least one of Ti (titanium) or Li (lithium) from the viewpoint of discharge characteristics.

In a case in which the negative electrode material for a lithium-ion secondary battery in the present disclosures includes other particles as a negative electrode active material, a content of other particles is preferably from 0.5% by mass to 20% by mass, and more preferably from 1% by mass to 15% by mass, with respect to the negative electrode material for a lithium-ion secondary battery.

<Negative Electrode for Lithium-Ion Secondary Battery>

A negative electrode for a lithium-ion secondary battery in the present disclosures has: a current collector; and a negative electrode material layer that is provided on or above the current collector and that contains the negative electrode material for a lithium-ion secondary battery in the present disclosures. The current collector and the negative electrode material layer will be described later.

<Lithium-Ion Secondary Battery>

A lithium-ion secondary battery in the present disclosures is not particularly limited as long as a negative electrode includes the negative electrode material for a lithium-ion secondary battery in the present disclosures. The negative electrode material for a lithium-ion secondary battery in the present disclosures may be included in a negative electrode material layer.

<Overview of Lithium-ion Secondary Battery>

First, an overview of a lithium-ion secondary battery is briefly described. The lithium-ion secondary battery has a structure in which a positive electrode, a negative electrode, a separator and a non-aqueous electrolytic solution are housed in a battery container. The separator is arranged between the positive electrode and the negative electrode.

A battery charger is connected between the positive electrode and the negative electrode when the lithium-ion secondary battery is to be charged. During the charging, lithium-ions inserted into a positive electrode active material are desorbed and released into the electrolytic solution. The lithium-ions released into the electrolytic solution migrate in the electrolytic solution, pass through the separator, and reach the negative electrode. The lithium-ions that have reached the negative electrode are inserted into a negative electrode active material included in the negative electrode.

An external load is connected between the positive electrode and the negative electrode when the lithium-ion secondary battery is to be discharged. During the discharging, the lithium-ions inserted into the negative electrode active material are desorbed and released into the electrolytic solution, and electrons are released from the negative electrode. The lithium-ions released into the electrolytic solution migrate in the electrolytic solution, pass through the separator, and reach the positive electrode. The lithium-ions that have arrived at the positive electrode are inserted into a positive electrode active material included in the positive electrode. At this time, the lithium-ions are inserted into the positive electrode active material, whereby electrons flow into the positive electrode. In such a manner, discharging is caused to occur by the migration of electrons from the negative electrode to the positive electrode.

The charging and discharging of the lithium-ion secondary battery are performed by the insertion/desorption of lithium-ions between the positive electrode active material and the negative electrode active material in such a manner. A configuration example of an actual lithium-ion secondary battery will be described later (see, for example, FIG. 1).

Next, the positive electrode, negative electrode, non-aqueous electrolytic solution, separator, and other configuration members as necessary, which are constituent elements of a lithium-ion secondary battery will be described below.

(Positive Electrode)

The lithium-ion secondary battery in the present disclosure includes a positive electrode that can be applied to a lithium-ion secondary battery with high capacity and high input/output and is described below. The positive electrode (positive electrode plate) in the present disclosure includes a current collector (positive electrode current collector) and a positive electrode material layer arranged on a surface of the current collector. The positive electrode material layer is a layer including at least a positive electrode active material, which is arranged on the surface of the current collector.

The positive electrode active material preferably includes a lithium nickel manganese cobalt complex oxide having a lamellar structure (herein after also referred to as a "NMC"). The NMC tends to be high capacity and excellent in safety.

For further improving safety, a mixture of NMC and a lithium nickel manganese complex oxide having a spinel structure (herein after also referred to as a "sp-Mn") is preferably used as a positive electrode active material.

From the viewpoint of high capacity of a battery, a content of NMC is preferably 65% by mass or more, more preferably 70% by mass or more, and still more preferably 80% by mass or more.

NMC represented by the following composition formula (1) is preferably used.

$$\text{Li}_{(1+\delta)}\text{Mn}_x\text{Ni}_y\text{Co}_{(1-x-y-z)}\text{M}_z\text{O}_2 \quad (1)$$

In the composition formula (1), (1+δ) represents a composition ratio of Li (lithium), x represents a composition ratio of Mn (manganese), y represents a composition ratio of Ni (nickel), (1−x−y−z) represents a composition ratio of Co (cobalt).

The element M is at least one element selected from the group consisting of Ti (titanium), Zr (zirconium), Nb (niobium), Mo (molybdenum), W (tungsten), Al (aluminium), Si (silicon), Ga (gallium), Ge (germanium) and Sn (tin).

δ, x, y and z meet the following conditions; −0.15<δ<0.15, 0.1<x≤0.5, 0.6<x+y+z<1.0, and 0≤z≤0.1.

sp-Mn represented by the following composition formula (2) is preferably used.

$$\text{Li}_{(1+\eta)}\text{Mn}_{(2-\lambda)}\text{M'}_\lambda\text{O}_4 \quad (2)$$

In the composition formula (2), (1+η) represents a composition ratio of Li (lithium), (2−λ) represents a composition ratio of Mn (manganese), λ represents a composition ratio of an element M'. A composition ratio of oxygen is 4.

The element M' is preferably at least one element selected from the group consisting of Mg (magnesium), Ca (calcium), St (strontium), Al, Ga, Zn (zinc) and Cu (copper).

η and λ meet the following conditions; 0≤η≤0.2 and 0≤λ≤0.1.

It is preferable to use Mg or Al as the element M' in the composition formula (2). By using Mg or Al, the life of the battery tends to be able to be increased, and additionally the safety of the battery tends to be able to be improved. The addition of the element M' enables the elution of Mn to be reduced, and therefore tends to enable improvement in storage characteristics and charge/discharge cycle characteristic.

Another positive electrode active material other than NMC and sp-Mn may be used.

As another positive electrode active material other than NMC and sp-Mn, a conventionally used positive electrode active material can be used. Examples thereof include a lithium-containing complex metal oxide other than NMC and sp-Mn, an olivine type lithium salt, a chalcogen compound, and manganese dioxide.

The lithium-containing composite metal oxide is a metallic oxide containing lithium and a transition metal, or a metallic oxide in which a part of the transition metal in the metallic oxide is replaced with a different element. Examples of such a different element include Na, Mg, Sc, Y, Mn, Fe, Co, Ni, Cu, Zn, Al, Cr, Pb, Sb, V and B, and Mn, Al, Co, Ni or Mg are preferable. The different elements may be used singly, or in combination of two or more kinds thereof.

Examples of the another positive electrode active material other than NMC and sp-Mn include $Li_xCoO_2$, $Li_xNiO_2$, $Li_xMnO_2$, $Li_xCo_yNi_{1-y}O_2$, $Li_xCo_yM^1_{1-y}O_z$, (in $Li_xCo_yM^1_{1-y}O_z$, $M^1$ represents at least one element selected from the group consisting of Na, Mg, Sc, Y, Mn, Fe, Ni, Cu, Zn, Al, Cr, Pb, Sb, V and B), $Li_xNi_{1-y}M^2_yO_z$ (in $Li_xNi_{1-y}M^2_yO_z$, $M^2$ represents at least one element selected from the group consisting of Na, Mg, Sc, Y, Mn, Fe, Co, Cu, Zn, Al, Cr, Pb, Sb, V and B). Herein, in the formulas, x meets $0<x\leq1.2$, y has a range of from 0 to 0.9, and z has a range of from 2.0 to 2.3. The x value representing the molar ratio of lithium fluctuates by charging and discharging.

Examples of the olivine type lithium salt include $LiFePO_4$. Examples of the chalcogen compound include titanium disulfide and molybdenum disulfide. The positive electrode active materials may be used singly, or in combination of two or more kinds thereof.

The positive electrode material layer and the current collector will now be described in detail. The positive electrode material layer contains a positive electrode active material, a binder, and the like, and is arranged on the current collector. A method of forming the positive electrode material layer is not limited, and the positive electrode material layer is formed, for example, in the following manner. The positive electrode material layer can be formed by mixing a positive electrode active material, a binder, and other materials such as an electroconductive agent and a thickener used if necessary in a dry process to make a sheet form, which is attached to the current collector by pressure (dry method). Alternatively, the positive electrode material layer can be formed by dissolving or dispersing a positive electrode active material, a binder, and other materials such as an electroconductive agent and a thickener used if necessary in a dispersion solvent to make a positive electrode material mixture slurry, which is applied to the current collector, and is dried (wet method).

As the positive electrode active material, a lithium nickel manganese cobalt complex oxide having a lamellar structure (NMC) is preferably used as described above. The positive electrode active material is used and mixed in powdery (granular) form.

Particles having a shape such as a lump shape, a polyhedron shape, a spherical shape, an ellipsoidally spherical shape, a plate shape, an acicular shape, or a columnar shape can be used as particles of the positive electrode active material such as NMC or sp-Mn.

The average particle size (d50) of the particles of the positive electrode active material such as NMC or sp-Mn (the average particle size (d50) of secondary particles in a case in which primary particles aggregate to form the secondary particles) is preferably from 1 μm to 30 μm, more preferably from 3 μm to 25 μm, and still more preferably from 5 μm to 15 μm, from the viewpoint of a tap density (filling property) and a property of mixing with other materials when forming an electrode. The average particle size (d50) of the particles of the positive electrode active material can be measured in a manner similar to the manner in the case of the graphitic particles.

A BET specific surface area of the particles of the positive electrode active material such as NMC and sp-Mn is preferably from 0.2 $m^2/g$ to 4.0 $m^2/g$, more preferably from 0.3 $m^2/g$ to 2.5 $m^2/g$, and still more preferably from 0.4 $m^2/g$ to 1.5 $m^2/g$.

In a case in which the BET specific surface area of the particles of the positive electrode active material is 0.2 $m^2/g$ or more, there is a tendency that a battery performance is excellent. In a case in which t the BET specific surface area of the particles of the positive electrode active material is 4.0 $m^2/g$ or less, there is a tendency that a tap density is improved so that a mixing performance with binder, electroconductive agent or the like is excellent.

Examples of the electroconductive agent for a positive electrode include: a metal material such as copper or nickel; graphite such as natural graphite or artificial graphite; carbon black such as acetylene black; and a carbonaceous material such as amorphous carbon such as needle coke. Such electroconductive agents for a positive electrode may be used singly, or in combination of two or more kinds thereof.

A content of the electroconductive agent is preferably from 0.01% by mass to 50% by mass, more preferably from 0.1% by mass to 30 by mass, and still more preferably from 1% by mass to 15% by mass, with respect to a mass of positive electrode material layer. In a case in which the content of the electroconductive agent is 0.01% by mass or more, there is a tendency that a sufficient electroconductive property is obtained. In a case in which t the content of the electroconductive agent is 50% by mass or less, there is a tendency that reduction of battery performance is suppressed.

A binder for a positive electrode is not particularly limited, and in a case in which the positive electrode material layer is formed by wet method, a material having superior solubility or dispersibility in a dispersing solvent is selected as the binder. Specific examples thereof include: a resin polymer such as polyethylene, polypropylene, poly(ethylene terephthalate), polyimide or cellulose; a rubber polymer such as SBR (styrene-butadiene rubber), NBR (acrylonitrile-butadiene rubber); fluorinated polymer such as poly(vinylidene fluoride) (PVdF), polytetrafluoroethylene, polytetrafluoroethyl ene-vinylidene fluoride copolymer or fluorinated poly(vinylidene fluoride); and a polymer composition having ion conductivity of an alkali metal ion (especially lithium-ion). The binder for a positive electrode may be used singly, or in a combination of two or more thereof.

From the viewpoint of stability of positive electrode, the binder preferably includes fluorinated polymer such as poly (vinylidene fluoride) (PVdF) or polytetrafluoroethylene-vinylidene fluoride copolymer.

A content of the binder is preferably from 0.1% by mass to 60% by mass, more preferably from 1% by mass to 40% by mass, and still more preferably from 3% by mass to 10% by mass, with respect to a mass of the positive electrode material layer.

In a case in which the content of the binder is 0.1% by mass or more, there is a tendency that the positive electrode active material can be sufficiently bound, the sufficient mechanical strength of the positive electrode material layer can be obtained, and battery performance such as cycle characteristics is improved. In a case in which the content of the binder is 60% by mass or less, there is a tendency that sufficient battery performance and a sufficient electroconductive property can be obtained.

The thickener is effective for adjusting viscosity of a slurry. Examples of the thickener is not particularly limited, specifically include carboxymethylcellulose, methylcellulose, hydroxymethylcellulose, ethylcellulose, polyvinyl alcohol, oxidized starch, phosphorylated starch, and casein and salts thereof. The thickener may be used singly, or in combination of two or more kinds thereof.

In a case in which the thickener is used, a content of the thickener with respect to a mass of the positive electrode material layer is preferably from 0.1% by mass to 20% by mass, more preferably from 0.5% by mass to 15% by mass, and still more preferably from 1% by mass to 10% by mass, from the viewpoint of input-output performance and battery performance.

The dispersion solvent for forming the slurry is not limited, as long as the dispersion solvent is a solvent capable of dissolving or dispersing the positive electrode active material, the binder and if necessary, the electroconductive agent and the thickener. Either an aqueous medium or an organic solvent may be used as the dispersion solvent. Examples of the aqueous medium include water, an alcohol, and a mixed solvent of an alcohol and water. Examples of the organic solvent include N-methyl-2-pyrrolidone (NMP), dimethylformamide, dimethyl acetamide, methyl ethyl ketone, cyclohexanone, methyl acetate, methyl acrylate, tetrahydrofuran (THF), toluene, acetone, diethyl ether, dimethyl sulfoxide, benzene, xylene, and hexane. It is preferable to use a thickening material particularly in a case in which an aqueous medium is used.

It is preferable to press the positive electrode material layer, formed on the current collector using wet method or dry method, by a hand press, a roller press, or the like in order to improve the filling density of the positive electrode active material.

A density of the pressed positive electrode material layer is preferably in a range of from 2.5 g/cm$^3$ to 3.5 g/cm$^3$, more preferably in a range of from 2.55 g/cm$^3$ to 3.15 g/cm$^3$, and still more preferably in a range of from 2.6 g/cm$^3$ to 3.0 g/cm$^3$, from the viewpoint of further improving input-output performance and safety.

From the viewpoint of further improving energy density and input-output performance, an amount of a positive electrode material mixture slurry applied to one side of a current collector is preferably from 30 g/m$^2$ to 170 g/m$^2$, more preferably from 40 g/m$^2$ to 160 g/m$^2$, and still more preferably from 40 g/m$^2$ to 150 g/m$^2$ in terms of the solid content of a positive electrode material mixture.

Considering the amount of a positive electrode material mixture slurry applied to one side of a current collector and the density of a positive electrode mixture layer, an average thickness of a positive electrode mixture layer is preferably from 19 μm to 68 μm, more preferably from 23 μm to 64 μm, and still more preferably from 36 μm to 60 μm. In the present disclosures, the average thickness of an electrode mixture layer means an average value of a thicknesses of 10 points randomly.

Materials for a current collector of a positive electrode is not particularly limited. Among them, a metal material is preferable and aluminum is more preferable. The shape of the current collector is not particularly limited, and materials worked into various shapes can be used. Examples of the metal material include metal foils, metal plates, metallic thin films, and expanded metals. Especially, it is preferable to use a metallic thin film. The thin film may be formed in mesh form, if appropriate.

An average thickness of the current collector is not particularly limited. From the view point of obtaining a sufficient strength and a flexibility as a current collector, the average thickness of the current collector is preferably from 1 μm to 1 mm, more preferably from 3 μm to 100 μm, and still more preferably from 5 μm to 100 μm.

(Negative Electrode)

The lithium-ion secondary battery in the present disclosure includes a negative electrode that can be applied to a lithium-ion secondary battery with high capacity and high input/output, and that is described below. The negative electrode (negative electrode plate) in the present disclosure includes a current collector (negative electrode current collector) and a negative electrode material layer arranged on a surface of the current collector. The negative electrode material layer is a layer including at least a negative electrode active material, which is arranged on the surface of the current collector. The negative electrode for a lithium-ion secondary battery in the present disclosure can be used as the negative electrode.

The negative electrode material for a lithium-ion secondary battery in the present disclosure is used as the negative electrode active material included in the negative electrode material layer in the lithium-ion secondary battery in the present disclosure.

A content of the negative electrode material for a lithium-ion secondary battery in the present disclosure is preferably 80% by mass or more, more preferably 85% by mass or more, and still more preferably 90% by mass or more, with respect to the total amount of the negative electrode material layer, from the viewpoint of the higher capacity of a battery.

The negative electrode material layer and the current collector will now be described in detail. The negative electrode material layer contains a negative electrode active material, a binder, and the like, and is arranged on the current collector. A method of forming the negative electrode material layer is not limited, and the negative electrode material layer is formed, for example, in the following manner. The negative electrode material layer can be formed by dissolving or dispersing a negative electrode active material, a binder, and other materials such as an electroconductive agent and a thickener used if necessary in a dispersion solvent to make a negative electrode material mixture slurry, which is applied to the current collector, and is dried (wet method).

Graphite such as natural graphite or artificial graphite, other than graphitic particles in the negative electrode material for a lithium-ion secondary battery in the present disclosure, carbon black such as acetylene black, amorphous carbon such as needle coke, or the like can be used as the electroconductive agent for a negative electrode. Such electroconductive agents for a negative electrode can be used singly, or in combination of two or more kinds thereof. As described above, the addition of the electroconductive agent tends to result in exhibition of the effect of reducing the resistance of an electrode.

A content of the electroconductive agent with respect to the mass of the negative electrode material layer is preferably from 1% by mass to 45% by mass, more preferably from 2% by mass to 42% by mass, and still more preferably from 3% by mass to 40% by mass, from the viewpoint of improving an electroconductive property and reducing an initial irreversible capacity. In a case in which the content of the electroconductive agent is 1% by mass or more, there is a tendency that a sufficient electroconductive property can be easily obtained. In a case in which the content of the electroconductive agent is 45% by mass or less, there is a tendency that reduction of battery performance can be suppressed.

The binder for a negative electrode is not particularly limited as long as the binder is a material stable against a non-aqueous electrolytic solution or a dispersion solvent used when forming an electrode. Specific examples thereof include: a resin polymer such as polyethylene, polypropylene, poly(ethylene terephthalate), cellulose and nitrocellulose; a rubber polymer such as SBR (styrene-butadiene rubber), NBR (acrylonitrile-butadiene rubber); fluorinated polymer such as poly(vinylidene fluoride) (PVdF), polytetrafluoroethylene and fluorinated poly(vinylidene fluoride); and a polymer composition having ion conductivity of an alkali metal ion (especially lithium-ion). The binder for a negative electrode may be used singly, or in a combination of two or more thereof. Among them, the binder preferably includes SBR or fluorinated polymer such as poly(vinylidene fluoride).

A content of the binder is preferably from 0.1% by mass to 20% by mass, more preferably from 0.5% by mass to 15% by mass, and still more preferably from 0.6% by mass to 10% by mass, with respect to a mass of the negative electrode material layer.

In a case in which the content of the binder is 0.1% by mass or more, there is a tendency that the negative electrode active material can be sufficiently bound, and the sufficient mechanical strength of the negative electrode material layer can be obtained. In a case in which the content of the binder is 20% by mass or less, there is a tendency that sufficient battery performance and a sufficient electroconductive property can be obtained.

In a case in which fluorinated polymer such as poly(vinylidene fluoride) is mainly used in the binder, a content of the binder is preferably from 1% by mass to 15% by mass, more preferably from 2% by mass to 10% by mass, and still more preferably from 3% by mass to 8% by mass, with respect to a mass of the negative electrode material layer.

The thickener is effective for adjusting viscosity. Examples of the thickener is not particularly limited, specifically include carboxymethylcellulose, methylcellulose, hydroxymethylcellulose, ethylcellulose, polyvinyl alcohol, oxidized starch, phosphorylated starch, and casein and salts thereof. The thickener may be used singly, or in combination of two or more kinds thereof.

In a case in which the thickener is used, a content of the thickener with respect to a mass of the negative electrode material layer is preferably from 0.1% by mass to 5% by mass, more preferably from 0.5% by mass to 3% by mass, and still more preferably from 0.6% by mass to 2% by mass, from the viewpoint of input-output performance and battery performance.

The dispersion solvent for forming the slurry is not limited, as long as the dispersion solvent is a solvent capable of dissolving or dispersing the negative electrode active material, the binder and if necessary, the electroconductive agent and the thickener. Either an aqueous medium or an organic solvent may be used as the dispersion solvent. Examples of the aqueous medium include water, an alcohol, and a mixed solvent of an alcohol and water. Examples of the organic solvent include N-methyl-2-pyrrolidone (NMP), dimethylformamide, dimethyl acetamide, methyl ethyl ketone, cyclohexanone, methyl acetate, methyl acrylate, tetrahydrofuran (THF), toluene, acetone, diethyl ether, dimethyl sulfoxide, benzene, xylene, and hexane. It is preferable to use a thickening material particularly in a case in which an aqueous medium is used.

A density of the negative electrode material layer is preferably from 0.7 $g/cm^3$ to 2 $g/cm^3$, more preferably from 0.8 $g/cm^3$ to 1.9 $g/cm^3$, and still more preferably from 0.9 $g/cm^3$ to 1.8 $g/cm^3$.

In a case in which the density of the negative electrode material layer is 0.7 $g/cm^3$ or more, there is a tendency that an electroconductive property between the negative electrode active materials is improved so that an increase in battery resistance can be suppressed, and a capacity per unit volume can be improved. In a case in which the density of the negative electrode material layer is 2 $g/cm^3$ or less, there is a tendency that the possibility of causing the degradation of discharge characteristics, which is arisen from an increase in initial irreversible capacity and the deterioration of the permeability of a non-aqueous electrolytic solution into the vicinity of the interface between the current collector and the negative electrode active material, is decreased.

From the viewpoint of energy density and input-output performance, an amount of a negative electrode material mixture slurry applied to one side of a current collector is preferably from 30 $g/m^2$ to 150 $g/m^2$, more preferably from 40 $g/m^2$ to 140 $g/m^2$, and still more preferably from 45 $g/m^2$ to 130 $g/m^2$ in terms of the solid content of a negative electrode material mixture.

Considering the amount of a negative electrode material mixture slurry applied to one side of a current collector and the density of a negative electrode mixture layer, an average thickness of a negative electrode mixture layer is preferably from 10 μm to 150 μm, more preferably from 15 μm to 140 μm, and still more preferably from 15 μm to 120 μm.

A material of the current collector for a negative electrode is not particularly limited. Examples thereof include metallic materials such as copper, nickel, stainless steel, or nickel-plated steel. Among them, copper is preferred from the viewpoint of the easiness of working and a cost.

A shape of the current collector is not particularly limited, and materials worked into various shapes can be used. Examples thereof include metal foils, metal plates, metallic thin films and expanded metals. Among them, a metal thin films is preferred, and a copper foil is more preferred. Examples of the copper foil include a rolled copper foil formed by a rolling method and an electrolytic copper foil formed by an electrolytic method, each of which is preferred as the current collector.

An average thickness of the current collector is not particularly limited, and for example, preferably from 5 μm to 50 μm, more preferably from 8 μm to 40 μm, and still more preferably from 9 μm to 30 μm.

In a case in which the average thickness of the current collector is less than 25 μm, the strength of the current collector can be improved by using a strong copper alloy (phosphor bronze, copper-titanium alloy, Corson alloy, Cu—Cr—Zr alloy, or the like) rather than pure copper.

<Non-aqueous Electrolytic Solution>

In general, a non-aqueous electrolytic solution includes a non-aqueous solvent, and a lithium salt (an electrolyte).

First, the non-aqueous solvent will be explained.

Examples of the non-aqueous solvent include cyclic carbonates, chain carbonates and cyclic sulfonic acid esters.

Preferred examples of the cyclic carbonate include cyclic carbonates including an alkylene group which composes a ring of the cyclic carbonate, the alkylene group having from 2 to 6 carbon atoms, and more preferably from 2 to 4 carbon atoms. Specific examples thereof include ethylene carbonate, propylene carbonate, and butylene carbonate. Among them, ethylene carbonate or propylene carbonate is preferred.

Preferred examples of a chain carbonate include dialkyl carbonates, preferably including two alkyl groups each of which independently has from 1 to 5 carbon atoms, and more preferably from 1 to 4 carbon atoms. Specific examples thereof include symmetric chain carbonates such as dimethyl carbonate, diethyl carbonate, or di-n-propyl carbonate, and asymmetric chain carbonates such as methylethyl carbonate, methyl-n-propyl carbonate, or ethyl-n-propyl carbonate. Among them, dimethyl carbonate, and methylethyl carbonate are preferred. Dimethyl carbonate is superior in oxidation resistance and reduction resistance to diethyl carbonate, and therefore tends to be able to improve cycle characteristics. Methylethyl carbonate has an asymmetrical molecular structure and a low melting point, and therefore tends to be able to improve low-temperature characteristics. A mixed solvent in which ethylene carbonate, dimethyl carbonate, and ethylmethyl carbonate are combined is particularly preferred because the mixed solvent can ensure battery characteristics in a wide temperature range, and is therefore.

From the viewpoint of battery characteristics, a content of cyclic carbonate and chain carbonate is preferably 85% by mass or more, more preferably 90% by mass or more, and still more preferably 95% by mass or more, with respect to the total amount of nonaqueous solvent.

With regard to a mixing ratio between a cyclic carbonate and a chain carbonate in a case in which the cyclic carbonate and the chain carbonate are used in combination, cyclic carbonate/chain carbonate (volume ratio) is preferably from 1/9 to 6/4, and more preferably from 2/8 to 5/5, from the viewpoint of battery characteristics.

Examples of the cyclic sulfonic acids include 1,3-propanesultone, 1-methyl-1,3-propanesultone, 3-methyl-1,3-propanesultone, 1,4-butanesultone, 1,3-propenesultone, and 1,4-butenesultone. Among them, 1,3-propanesultone and 1,4-butanesultone are particularly preferred from the viewpoint of enabling direct-current resistance to be further reduced.

The non-aqueous electrolytic solution may further include a chain ester, a cyclic ether, a chain ether, a cyclic sulfone, or the like.

Examples of the chain ester include methyl acetate, ethyl acetate, propyl acetate, and methyl propionate. Among them, methyl acetate is preferably used from the viewpoint of improving low-temperature characteristics.

Examples of the cyclic ether include tetrahydrofuran, 2-methyltetrahydrofuran, and tetrahydropyran.

Examples of the chain ether include dimethoxyethane and dimethoxymethane.

Examples of the cyclic sulfone include sulfolane and 3-methylsulfolane.

The non-aqueous electrolytic solution may contain a silyl phosphate ester compound.

Specific examples of the silyl phosphate ester compound include tris(trimethylsilyl)phosphate, dimethyl trimethylsilyl phosphate, methyl bis(trimethylsilyl)phosphate, diethyl trimethylsilyl phosphate, ethyl bis(trimethylsilyl)phosphate, dipropyl trimethylsilyl phosphate, propyl bis(trimethylsilyl)phosphate, dibutyl trimethylsilyl phosphate, butyl bis(trimethylsilyl)phosphate, dioctyl trimethylsilyl phosphate, octyl bis(trimethylsilyl)phosphate, diphenyl trimethylsilyl phosphate, phenyl bis(trimethylsilyl)phosphate, di(trifluoroethyl)(trimethylsilyl)phosphate, trifluoroethyl bis(trimethylsilyl)phosphate, a compound in which a trimethylsilyl group of the above-described silyl phosphate ester is substituted with a triethylsilyl group, a triphenylsilyl group, a t-butyldimethylsilyl group, or the like, and a compound having a so-called condensed phosphoric acid ester structure in which phosphate esters are condensed, and phosphorus atoms are bonded through oxygen.

Among them, tris(trimethylsilyl)phosphate (TMSP) is preferably used. An increase in resistance can be suppressed by adding a smaller amount of tris(trimethylsilyl)phosphate than those of the other silyl phosphate ester compounds.

Such silyl phosphate esters may be used singly, or in combination of two or more kinds thereof.

In a case in which the non-aqueous electrolytic solution contains a silyl phosphate ester compound, a content of the silyl phosphate ester compound is preferably from 0.1% by mass to 5% by mass, more preferably from 0.3% by mass to 3% by mass, and still more preferably from 0.4% by mass to 2% by mass, with respect to the total amount of the non-aqueous electrolytic solution.

In particular, in a case in which the non-aqueous electrolytic solution contains tris(trimethylsilyl)phosphate (TMSP), a content of tris(trimethylsilyl)phosphate (TMSP) is preferably from 0.1% by mass to 0.5% by mass, more preferably from 0.1% by mass to 0.4% by mass, and still more preferably from 0.2% by mass to 0.4% by mass, with respect to the total amount of the non-aqueous electrolytic solution. In a case in which the content of TMSP is in the range described above, there is a tendency that life characteristics can be improved by the function of a thin SEI (Solid Electrolyte Interphase), or the like.

The non-aqueous electrolytic solution may contain vinylene carbonate (VC). Use of VC allows a stable coating to be formed on a surface of a negative electrode when charging a lithium-ion secondary battery. The coating has the effect of suppressing the decomposition of the non-aqueous electrolytic solution at the surface of the negative electrode.

A content of vinylene carbonate is preferably from 0.3% by mass to 1.6% by mass, more preferably from 0.3% by mass to 1.5% by mass, and still more preferably from 0.3% by mass to 1.3% by mass, with respect to the total amount of the non-aqueous electrolytic solution. In a case in which the content of vinylene carbonate is in the range described above, there is a tendency that life characteristics can be improved, and decreasing charge-discharge efficiency, which is arisen from decomposition of surplus VC when charging and discharging a lithium-ion secondary battery, can be prevented.

A lithium salt (electrolyte) will now be described.

The lithium salt is not particularly limited as long as the lithium salt can be used as an electrolyte of a non-aqueous electrolytic solution for a lithium-ion secondary battery, and examples thereof include inorganic lithium salts, fluorine-containing organic lithium salts, and oxalatoborate salts described below.

Examples of the inorganic lithium salts include inorganic fluoride salts such as $LiPF_6$, $LiBF_4$, $LiAsF_6$, and $LiSbF_6$, perhalates such as $LiClO_4$, $LiBrO_4$, and $LiIO_4$, and inorganic chloride salts such as $LiAlCl_4$.

Examples of the fluorine-containing organic lithium salts include: perfluoroalkanesulfonate salts such as $LiCF_3SO_3$; perfluoroalkanesulfonyl imide salts such as $LiN(CF_3SO_2)_2$, $LiN(CF_3CF_2SO_2)_2$, and $LiN(CF_3SO_2)(C_4F_9SO_2)$; perfluoroalkanesulfonyl methide salts such as $LiC(CF_3SO_2)_3$; and fluoroalkylfluorophosphate salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$.

Examples of the oxalatoborate salts include lithium bis(oxalato)borate and lithium difluorooxalatoborate.

Such lithium salts may be used singly, or in combination of two or more kinds thereof. Especially, lithium hexafluorophosphate ($LiPF_6$) is preferred in comprehensive consideration of solubility in a solvent, charge-discharge characteristics, output characteristics, cycle characteristics, and the like when producing a lithium-ion secondary battery.

A concentration of the electrolyte in an electrolytic solution is not particularly limited. A range of the concentration of the electrolyte is as follows. A lower limit of the concentration may be 0.5 mol/L or more, and preferably 0.6 mol/L or more, and more preferably 0.7 mol/L or more. An upper limit of the concentration may be 2 mol/L or less, and preferably 1.8 mol/L or less, and more preferably 1.7 mol/L or less. In a case in which the concentration of the electrolyte is 0.5 mol/L or more, a sufficient electric conductivity tends to be obtained. In a case in which the concentration of lithium salt (electrolyte) is 2 mol/L or less, an increasing of viscosity tends to be inhibited, thereby increasing an electric conductivity, and the performance of the lithium-ion secondary battery tends to be improved by increasing of the electric conductivity of the non-aqueous electrolytic solution.

<Separator>

There is no particular restriction on a separator, insofar as it has ion permeability while insulating electronically between the positive electrode and the negative electrode, and is resistant to oxidizing environment at the positive electrode and to reducing environment at the negative electrode. As a material for a separator satisfying such characteristics, a resin, an inorganic substance or the like may be used.

As the resin, an olefinic polymer, a fluorinated polymer, a cellulosic polymer, polyimide, nylon or the like are used. Among them, it should be preferably selected from materials which are stable against the non-aqueous electrolyte solution and superior in solution retention, and preferably a porous sheet, or a nonwoven fabric made from a polyolefin such as polyethylene and polypropylene.

As the inorganic substance, an oxide such as alumina and silicon dioxide, a nitride such as aluminum nitride and silicon nitride, a glass or the like are used. For example, a substrate in a thin film shape such as a nonwoven fabric, a woven fabric and a microporous film, to which the inorganic substance in a fiber shape or a particle shape is stuck, may be used as a separator. A substrate in a thin film shape with a pore diameter of from 0.01 µm to 1 µm and a thickness of from 5 µm to 50 µm may be used favorably. Further, a complex porous layer formed from the inorganic substance in a fiber shape or a particle shape using a binder such as a resin may be used as a separator. Alternatively, the complex porous layer may be formed on a surface of another separator to become a multiple-layer separator. Alternatively, the complex porous layer may be formed on a surface of a positive electrode or a negative electrode as a separator.

<Other Configuration Members>

A cleavage valve may also be arranged as another configuration member of a lithium-ion secondary battery. By opening the cleavage valve, it is possible to suppress an increase in pressure in the battery, and improve the safety.

A configuration unit which releases an inert gas (such as carbon dioxide) with an increase in temperature may also be arranged. By arranging such a configuration unit, the cleavage valve may be rapidly opened owing to the generation of an inert gas, in a case in which temperature in the battery increases, leading to improvement in safety. Examples of materials used in the configuration unit include lithium carbonate, polyethylene carbonate, polypropylene carbonate.

In the present disclosures, the term "negative electrode capacity" represents "discharge capacity of negative electrode". In the present disclosures, the term "positive electrode capacity" represents "initial charging capacity of positive electrode—irreversible capacity of either negative electrode or positive electrode, whichever is greater". Herein, the term "discharge capacity of negative electrode" is defined as a discharge capacity calculated by a charge/discharge apparatus when lithium-ions inserted into a negative electrode active material are desorbed. The term "initial charging capacity of positive electrode" is defined as an initial charging capacity calculated by a charge/discharge apparatus when lithium-ions are desorbed from a positive electrode active material.

The capacity ratio between the negative electrode and the positive electrode may also be calculated from, for example, "discharge capacity of lithium-ion secondary battery/discharge capacity of negative electrode". The discharge capacity of the lithium-ion secondary battery can be measured under the following conditions, for example, in a case in which constant-current constant-voltage (CCCV) charging is performed at 4.2 V and from 0.1 C to 0.5 C for a cutoff time of from 2 to 5 hours, and constant-current (CC) discharging is then performed at from 0.1 C to 0.5 C until 2.7 V is achieved. The discharge capacity of the negative electrode may be calculated by measuring a discharge capacity per predetermined area under the following conditions in a case in which the negative electrode used in the measurement of the discharge capacity of the lithium-ion secondary battery is cut into a predetermined area, a single electrode cell is produced by interposing a separator impregnated with an electrolytic solution between the cut negative electrode and a lithium metal used as a counter electrode, constant-current constant-voltage (CCCV) charging is performed at 0 V and 0.1 C for a cutoff current of 0.01 C, and constant-current (CC) discharging is then performed at 0.1 C until 1.5 V is achieved, and by converting the discharge capacity per predetermined area into the total area used as the negative electrode of the lithium-ion secondary battery. In the single electrode cell, the direction of the insertion of lithium-ions into the negative electrode active material is defined as charging, and the direction of the desorption of lithium-ions inserted into the negative electrode active material is defined as discharging. "C" means "current value (A)/discharge capacity (Ah) of battery".

<Lithium-ion Secondary Battery>

An embodiment in which the invention is applied to a 18650-type columnar lithium-ion secondary battery will now be described with reference to the drawing. FIG. 1 is a perspective cross-sectional view illustrating one example of a lithium-ion secondary battery in the present disclosures.

As illustrated in FIG. 1, a lithium-ion secondary battery 1 in the present disclosures includes a battery container 6 which is made of nickel-plated steel and has a bottomed cylindrical shape. An electrode group 5 obtained by cross-sectionally spirally winding a belt-shaped positive electrode plate 2 and a negative electrode plate 3 between which a separator 4 is interposed is housed in the battery container 6. For example, the width and thickness of the separator 4 are set at 58 mm and 30 μm, respectively. A positive electrode tab terminal, of which one end is fixed to the positive electrode plate 2 and which is made of aluminum and has a ribbon shape, is protruded through the upper end surface of the electrode group 5. By ultrasonic welding, the other end of the positive electrode tab terminal is joined to the under surface of a disc-shaped battery lid which is arranged in the upper side of the electrode group 5 and becomes a positive electrode external terminal. A negative electrode tab terminal of which one end is fixed to the negative electrode plate 3, and which is made of copper and has a ribbon shape is protruded through the lower end surface of the electrode group 5. The other end of the negative electrode tab terminal is joined to the inner bottom of the battery container 6 by resistance welding. Accordingly, the positive electrode tab terminal and the negative electrode tab terminal are protruded through the end surfaces of the electrode group 5, which are sides opposite to each other, respectively. An insulating coating, of which an illustration is omitted, is formed on the entire periphery of the outer peripheral surface of the electrode group 5. A battery lid is swaged and fixed to the upper portion of the battery container 6 so that a gasket made of an insulating resin is interposed between the battery lid and the upper portion. Therefore, the interior of the lithium-ion secondary battery 1 is sealed. A non-aqueous electrolytic solution, which is not illustrated, is injected into the battery container 6.

EXAMPLES

The present embodiment will be described in more details below by way of Examples, provided that the invention be not restricted in any way by the following Examples.

Example 1

[Production of Positive Electrode Plate]

A positive electrode plate was produced as follows. A lithium nickel manganese cobalt complex oxide having a lamellar structure (NMC, having a BET specific surface area of 0.4 m$^2$/g and an average particle size (d50) of 6.5 μm) was used as a positive electrode active material. Acetylene black (trade name: HS-100, average particle size of 48 nm (catalog value of Denka Company Limited), manufactured by Denka Company Limited) as an electroconductive agent and polyvinylidene fluoride as a binder were added in turn to the positive electrode active material, and the resultant was mixed, thereby obtaining a mixture of the positive electrode material. A mass ratio was set at positive electrode active material: electroconductive agent:binder=90:5:5. Further, N-methyl-2-pyrrolidone (NMP) as a dispersion solvent was added to the mixture, and the resultant was kneaded, thereby forming a slurry. The slurry was substantially uniformly and homogeneously applied to both surfaces of an aluminum foil having an average thickness of 20 μm, and the aluminum foil is used as a current collector for a positive electrode. Then, the resultant was subjected to drying treatment, and consolidated to have a density of 2.7 g/cm$^3$ by press. The amount of positive electrode material mixture slurry applied to one surface was set at 40 g/m$^2$ in terms of the solid content of the positive electrode material mixture.

[Production of Negative Electrode Active Material]

A mixture was obtained by mixing 100 parts by mass of spherical natural graphite subjected to classification treatment and 10 parts by mass of coal-tar pitch (softening point of 90° C. and actual carbon ratio (carbonization rate) of 50%). Then, the mixture was subjected to heat treatment to produce graphitic particles including a low-crystalline carbon layer on the surfaces thereof. The heat treatment was performed by raising a temperature from 25° C. to 1000° C. at a temperature-raising rate of 200° C./h and maintaining the temperature at 1000° C. for 1 hour under flow of nitrogen. The obtained graphitic particles were crushed with a cutter mill, and sieved through a 300-mesh sieve to obtain a minus sieve, which was used as a negative electrode material (negative electrode active material). The obtained negative electrode active material had a standard deviation of circularity (standard deviation) within a specific range, a circularity at a cumulative frequency of 10% by particle (circularity at 10% by particle), an average particle size, a Raman R value (R-value), and a BET specific surface area (BET), respectively set forth in Table 1.

[Production of Negative Electrode Plate]

A negative electrode plate was produced as follows. Graphitic particles exhibiting a standard deviation of circularity (standard deviation) within a specific range, a circularity at a cumulative frequency of 10% by particle (circularity at 10% by particle), an average particle size, a Raman R value (R-value), and a BET specific surface area (BET) (interplanar spacing d002 in C-axis direction=0.336 nm), respectively set forth in Table 1 were used as a negative electrode active material.

Carboxymethyl cellulose (CMC) as a thickener and styrene-butadiene rubber (SBR) as a binder were added to the negative electrode active material. The mass ratio thereof was set at negative electrode active material: CMC: SBR=98:1:1. Purified water as a dispersion solvent was added to the resultant, and kneaded, thereby forming a slurry of each of Examples or Comparative Examples. A predetermined amount of the slurry was substantially uniformly and homogeneously applied to both surfaces of a rolled copper foil having an average thickness of 10 μm, and the rolled copper foil is used as a current collector for a negative electrode. The density of a negative electrode material layer was set at 1.3 g/cm$^3$.

[Production of Lithium-Ion Secondary Battery]

Each of the positive electrode plate or the negative electrode plate was cut into a predetermined size, a polyethylene single-layered separator (trade name: HIPORE, manufactured by Asahi Kasei Corp., "HIPORE" is a registered trademark) having an average thickness of 30 μm was pinched between the cut positive electrode and the cut negative electrode, and the resultant was wound to form an electrode body having a roll shape. In such a case, the lengths of the positive electrode, the negative electrode and the separator were adjusted so that the diameter of the electrode body was 17.15 mm. A lead for collecting a power was attached to the electrode body, the electrode body was inserted into a 18650 type battery case, and a non-aqueous electrolytic solution was then injected into the battery case. The non-aqueous electrolytic solution was obtained as follows. A mixed solvent was prepared by mixing ethylene carbonate (EC) as a cyclic carbonate, and dimethyl carbonate (DMC) and methylethyl carbonate (EMC) as chain carbonates at a volume ratio thereof of 2:3:2, and dissolving lithium hexafluorophosphate (LiPF$_6$) as a lithium salt (electrolyte) in the mixed solvent at a concentration of 1.2 mol/L. Subsequently, 1.0% by mass of vinylene carbonate (VC) was added to the mixed solvent to be the non-aqueous electrolytic solution. Finally, the battery case was sealed to complete a lithium-ion secondary battery.

[Evaluation of Battery Characteristics (Initial Charge-Discharge Efficiency)]

The produced lithium-ion secondary battery was constant-current charged up to 4.2 V at 0.5 C under an environment at 25° C., and was constant-voltage charged from the time of arrival at 4.2 V to the time at which a current value reached 0.01 C at this voltage. Then, the lithium-ion secondary battery was constant-current discharged at 0.5 C up to 2.7 V. Three cycles of the above were carried out. A 30-minute pause was made between the charge and the discharge. The lithium-ion secondary battery subjected to the three cycles was referred to as "initial state".

The lithium-ion secondary battery in the initial state was constant-current charged up to 4.2 V at a charge current value of 0.5 C under an environment at 25° C., and constant-current constant-voltage (CCCV) charged until a current value of 0.01 C as a cutoff condition was achieved. Then, the lithium-ion secondary battery was constant-current (CC) discharged at a discharge current value of 0.5 C until 3 V was achieved. A charge capacity and a discharge capacity at this time were measured, and regarded as an initial charging capacity and initial discharge capacity, respectively.

Initial charge-discharge efficiency was calculated from the following Formula. The results are set forth in Table 1. The higher initial charge-discharge efficiency suggests the lower irreversible capacity of the lithium-ion secondary battery.

Initial charge-discharge efficiency (%)=(initial discharge capacity/initial charge capacity)×100

[Evaluation of Pulse Charge Characteristics]

Pulse charge characteristics was determined based on the state of the precipitation of Li. The battery made to be in the initial state was left to stand for 5 hours in a constant-temperature bath at −30° C. so that the interior of the battery was at around an environmental temperature. Then, the battery was charged for 5 seconds at 20 A which was a current value equivalent to 20 C. Then, the battery was disassembled, and the state of the precipitation of Li was confirmed with an SEM (SU3500, manufactured by KEYENCE CORPORATION).

The obtained results are set forth in Table 1. A case in which Li was not precipitated was determined to exhibit excellent pulse charge characteristics.

Examples 2 to 7, and Comparative Examples 1 and 2

A negative electrode active material was produced in a manner similar to the manner of Example 1 except that classification conditions were changed. A standard deviation of circularity (standard deviation) within a specific range, a circularity at a cumulative frequency of 10% by particle (circularity at 10% by particle), an average particle size, a Raman R value (R-value), and a BET specific surface area (BET) of the obtained negative electrode active material is set forth in Table 1. The battery characteristics (initial charge-discharge efficiency) and pulse charge characteristics of the obtained negative electrode active material were evaluated in a manner similar to the manner of Example 1. The results are set forth in Table 1.

TABLE 1

|  | Standard Deviation | Circularity at 10% by Particle | Average Particle Size (μm) | R-Value | BET (m$^2$/g) | Li Precipitation | Initial Charge-Discharge Efficiency (%) |
| --- | --- | --- | --- | --- | --- | --- | --- |
| Example 1 | 0.05 | 0.863 | 8.4 | 0.38 | 4.0 | None | 93.7 |
| Example 2 | 0.08 | 0.893 | 9.4 | 0.37 | 3.8 | None | 93.9 |
| Example 3 | 0.08 | 0.743 | 9.2 | 0.37 | 3.9 | None | 92.3 |
| Example 4 | 0.09 | 0.899 | 8.5 | 0.38 | 4.1 | None | 92.2 |
| Example 5 | 0.08 | 0.881 | 15 | 0.38 | 3.9 | None | 93.7 |
| Example 6 | 0.05 | 0.800 | 20 | 0.37 | 3.9 | None | 94.2 |
| Example 7 | 0.10 | 0.894 | 8.5 | 0.36 | 4.2 | None | 92.2 |
| Comparative Example 1 | 0.04 | 0.865 | 8.8 | 0.37 | 4.0 | Appearance | 92.8 |
| Comparative Example 2 | 0.15 | 0.896 | 8.5 | 0.37 | 4.1 | None | 91.1 |

As is clear from Table 1, the lithium-ion secondary battery using the negative electrode material for a lithium-ion secondary battery in the present disclosure is found to be excellent in initial charge-discharge efficiency and pulse charge characteristics.

The entire contents of the disclosures by Japanese Patent Application No. 2017-1162 filed on Jan. 6, 2017 are incorporated herein by reference.

All the literature, patent application, and technical standards cited herein are also herein incorporated to the same extent as provided for specifically and severally with respect to an individual literature, patent application, and technical standard to the effect that the same should be so incorporated by reference.

The invention claimed is:

1. A negative electrode material for a lithium-ion secondary battery, comprising graphitic particles of which a standard deviation of circularity at a cumulative frequency ranging from 10% by particle to 90% by particle from a lower circularity, determined by a flow-type particle analyzer, is from 0.05 to 0.1.

2. The negative electrode material for a lithium-ion secondary battery according to claim 1, wherein the circularity at a cumulative frequency of 10% by particle of the graphitic particles is from 0.7 to 0.9.

3. The negative electrode material for a lithium-ion secondary battery according to claim 1, wherein an average particle size of the graphitic particles is from 2 μm to 30 μm.

4. The negative electrode material for a lithium-ion secondary battery according to claim 1, wherein a Raman R value (ID/IG), which is a ratio of a peak intensity ID within a range of from 1300 cm-$^1$ to 1400 cm-$^1$ to a peak intensity IG within a range of from 1580 cm$^{-1}$ to 1620 cm$^{-1}$, upon irradiating the graphitic particles with laser light at 532 nm is from 0.10 to 0.60.

5. The negative electrode material for a lithium-ion secondary battery according to claim 1, further comprising amorphous carbon particles, wherein a standard deviation of circularity at a cumulative frequency ranging from 10% by particle to 90% by particle from a lower circularity of mixed particles of the graphitic particles and the amorphous carbon particles, determined by a flow-type particle analyzer, is from 0.05 to 0.1.

6. The negative electrode material for a lithium-ion secondary battery according to claim 5, wherein a content of the amorphous carbon particles in the negative electrode material is from 1% by mass to 30% by mass.

7. A negative electrode for a lithium-ion secondary battery, comprising:
   a current collector; and
   a negative electrode material layer that is provided on or above the current collector and that comprises the negative electrode material for a lithium-ion secondary battery according to claim 1.

8. A lithium-ion secondary battery, comprising the negative electrode for a lithium-ion secondary battery according to claim 7.

* * * * *